United States Patent
Olson et al.

(10) Patent No.: US 7,854,848 B2
(45) Date of Patent: Dec. 21, 2010

(54) PORTABLE WATER TREATMENT APPARATUS AND METHODS

(75) Inventors: Judd D. Olson, Deephaven, MN (US); Robert J. Reuter, Woodbury, MN (US); Mark R. Stouffer, Middletown, CT (US); Benjamin P. Williams, St. Joseph, WI (US)

(73) Assignee: 3M Innovative Properties Company, Saint Paul, MN (US)

( * ) Notice: Subject to any disclaimer, the term of this patent is extended or adjusted under 35 U.S.C. 154(b) by 323 days.

(21) Appl. No.: 12/212,818

(22) Filed: Sep. 18, 2008

(65) Prior Publication Data

US 2010/0065503 A1   Mar. 18, 2010

(51) Int. Cl.
*B01D 15/00* (2006.01)

(52) U.S. Cl. ......................... 210/691; 210/694; 210/244; 210/359

(58) Field of Classification Search ................. 210/691, 210/694, 244, 359
See application file for complete search history.

(56) References Cited

U.S. PATENT DOCUMENTS

| | | | |
|---|---|---|---|
| 2,635,949 A * | 4/1953 | Fenske et al. ............... | 422/140 |
| 4,151,092 A | 4/1979 | Grimm et al. | |
| 4,441,996 A | 4/1984 | Hurst | |
| 4,477,347 A | 10/1984 | Sylva | |
| 5,019,252 A | 5/1991 | Kamei et al. | |
| 5,106,500 A | 4/1992 | Hembree et al. | |
| 5,164,082 A | 11/1992 | Lin | |
| 5,268,093 A | 12/1993 | Hembree et al. | |
| 5,709,794 A | 1/1998 | Emmons et al. | |
| 5,733,448 A | 3/1998 | Kaura | |
| 5,887,510 A | 3/1999 | Porter | |
| 6,344,146 B1 | 2/2002 | Moorehead et al. | |
| 6,379,544 B1 | 4/2002 | Chen | |
| 7,077,951 B2 | 7/2006 | Monteiro | |
| 2004/0144711 A1 | 7/2004 | Cluff et al. | |
| 2005/0051476 A1 | 3/2005 | Chen et al. | |
| 2005/0109689 A1 | 5/2005 | Trachtenbroit | |
| 2010/0043633 A1 * | 2/2010 | Galbraith ....................... | 95/68 |

FOREIGN PATENT DOCUMENTS

KR   10-1999-027173   4/1999

OTHER PUBLICATIONS

International Search Report PCT//US2009/052073 3 pgs., Apr. 27, 2010.

* cited by examiner

*Primary Examiner*—Chester T Barry
(74) *Attorney, Agent, or Firm*—Kenneth B. Wood

(57) ABSTRACT

Herein are disclosed apparatus and methods that can be used to receive a volume of potable water from a source and to treat the volume of water so as to improve the perceived or actual aesthetic quality of the water, and to thereafter contain the treated water such that it can be used or consumed. In general, the apparatus comprises a container capable of receiving a volume of water, and a capture element within the container that is capable of removing at least a portion of such substances in the water as may be perceived as impacting water quality. The capture element comprises sorbent media that is capable of removing at least some portion of such undesirable substances, and that may comprise, for example, activated carbon and the like.

24 Claims, 2 Drawing Sheets

PORTABLE WATER TREATMENT APPARATUS AND METHODS

BACKGROUND

It is common practice for persons to carry portable water containers and fill or refill them from available (e.g., public) potable water sources (drinking fountains, spigots, etc.). Often, persons may wish to improve the aesthetic quality of such water, in terms of taste, odor, color, etc.

SUMMARY

Herein are disclosed apparatus and methods that can be used to receive a volume of potable water from a source and to treat the volume of water so as to improve the perceived or actual aesthetic quality of the water, and to thereafter contain the treated water such that it can be used or consumed at will.

The apparatus comprises a container capable of receiving a volume of water, and a capture element within the container that is capable of removing at least a portion of certain undesirable substances that may be in the water. Such undesirable substances may include any substance that potentially impacts the taste, odor, and/or color of the water. The capture element comprises sorbent media that is capable of removing at least some portion of such undesirable substances, and may comprise, for example, activated carbon, activated carbon cloth, and the like.

In use of the apparatus and methods disclosed herein, a volume of water is deposited into the container, after which at least a portion of the volume of water is passed through the capture element such that at least some of the water passing through the capture element passes through the sorbent media in such a manner as to intimately contact the sorbent media such that at least a portion of any undesirable substance(s) present in the water is removed from the water. In a specific embodiment, at least a portion of the volume of water is passed through the capture element more than once so as to experience multiple (e.g., at least two) sequential passes through the capture element. In a further embodiment, this sequential passing of at least a portion of the volume of water through the capture element occurs in a reciprocating manner such that some of the water experiences multiple sequential passes through the capture element in opposite directions.

In various embodiments, the passing of water through the capture element may occur by moving the capture element through the volume of water; or, by holding the capture element stationary and moving water through the capture element.

In further embodiments, the sorbent media is selected to have a low pressure drop, and/or at least one bypass aperture is provided in the apparatus. Such arrangements may allow water to be treated by the apparatus described herein without an unacceptably high pressure drop; that is, without requiring an unduly large amount of force to pass the volume of water through the capture element. If present, such a bypass aperture may allow a portion of the volume of water to pass around the outside of the capture element, and/or to pass through the capture element without passing through the sorbent media.

The apparatus and methods described herein differ from the conventional approach of treating (i.e., removing at least a portion of undesirable substances from) a volume of water by flowing the water through a sorbent media in a single, one-directional pass. Such an approach may require a high force to be applied in order to pass the water through the media at a sufficient flowrate. The herein-disclosed apparatus is instead designed such that only such portion of a volume of the water as can be easily passed through the sorbent media by a relatively low force (e.g., as can be achieved by manual operation by a person) is treated in an individual pass of the volume of water through the capture element. However, the apparatus is designed such that multiple passes in succession can be performed (e.g., within a short time). Thus, a volume of water can be deposited into the container and multiple passes of water through the capture element can be performed in order to treat the water so as to improve the perceived aesthetic quality of the water.

In a specific embodiment, the capture element is provided as a movable capture element which is capable of being moved back and forth multiple times through at least a portion of a volume of water in the container.

Thus in one aspect, herein is disclosed an apparatus for treating a volume of water, comprising: a container defining an interior volume adapted to receive a volume of water; within the interior volume of the container, a capture element comprising a thickness and first and second major sides and comprising activated carbon sorbent media, wherein the capture element is arranged to be moved repeatedly through at least a portion of the volume of water.

Thus in another aspect, herein is disclosed a method of treating water, the method comprising: providing an apparatus that comprises a container that defines an interior volume adapted to receive a volume of water, and, a capture element comprising a thickness and first and second major sides and comprising sorbent media; depositing a volume of water into the interior volume of the container; and, passing at least a portion of the volume of water through the capture element from one major side of the capture element to the other major side of the capture element, at least two times.

These and other features and aspects of the present description will be more fully understood from the following detailed description of exemplary embodiments. It should be understood that the foregoing descriptions and the following detailed descriptions are exemplary and are not restrictive of the present description.

Figure 1:
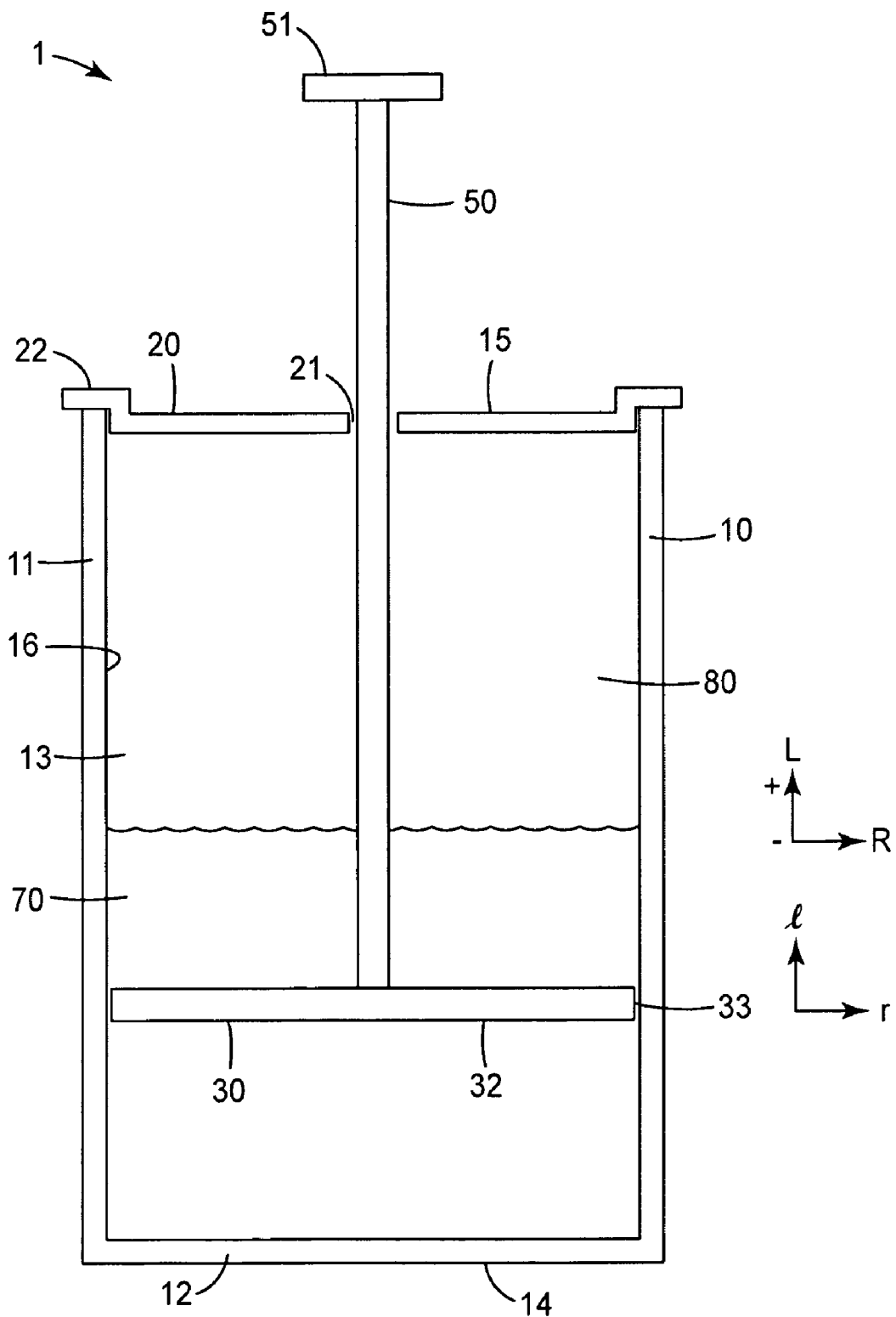
FIG. 1 is a side cross sectional view of an exemplary portable water treatment apparatus.

Drawings and elements therein are not to scale unless noted. In the Figures, like reference numerals are used to designate like features throughout. Although terms such as "top", "bottom", "upper", "lower", "over", "under", "front", "back", and "first" and "second" may be used in this disclosure, it should be understood that those terms are used in their relative sense only, unless noted herein.

DETAILED DESCRIPTION

Figure 2:
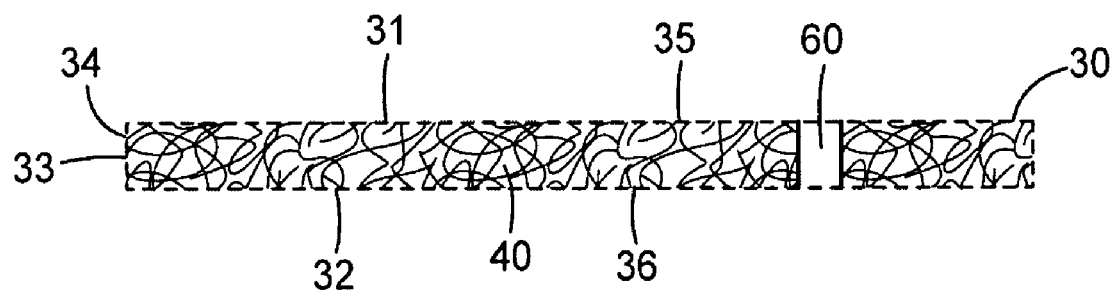
FIG. 2 is a side cross sectional view of an exemplary capture element.

Reference is made to FIGS. 1-2 in order to illustrate exemplary embodiments of the disclosures presented herein. Apparatus 1 comprises a container 10 comprising at least wall 11 and base 12 that together define an interior (e.g., bounded on at least three sides) volume 13. Container 10 may for example be in the form of a generally circular cylinder, although other shapes are possible if desired. Base 12 (at bottom end 14 of container 10) may have a relatively flat exterior surface, particularly if it is desired that container 10 be able to stand upright on a surface. Container 10 may be open at top end 15, such that a volume of water 70 may be deposited into container 10 so as to fill at least a portion of interior volume 13 of container 10. (If container 10 is not completely filled, volume of water 70 will typically occupy, under the influence of gravity, the lowermost portion of interior volume 13, with an air-filled space 80 being present above water 70). Optional lid 20 can be supplied to mount onto open top end 15 of container so as to partially or completely enclose interior volume 13. All or a portion of lid 20 can be partially or completely removable so as to allow deposition of water into, and/or removal of water out of, interior volume 13 of container 10. Lid 20 can comprise a flange 22 to more securely mate with the perimeter edge of open top end 15 of container 10 (if desired, lid 20 can screw onto the open end of container 10 for more secure attachment). Lid 20 can also contain one or more openings for addition or removal of water, for venting, and so on. In addition to lid 20, container 10 can also comprise at least one filling/emptying portal (e.g., valve, nipple, port, etc.) by which water may be deposited and/or removed from container 10. Container 10 can comprise a handle (e.g., attached to wall 11) if desired.

Wall 11 can be straight (as depicted in FIG. 1), or can be slightly tapered. The components of container 10, (e.g., wall 11, base 12, lid 20, handle, etc.) can be made of any suitable material or materials, for example those that are durable and formable (e.g., moldable) into a desired shape. For example, well known thermoplastic molding plastics (e.g., polypropylene) can be used; or, metal can be used, e.g. stainless steel. In one embodiment, the components of container 10 are sufficiently lightweight that container 10 can be hand-carried by a person.

In a particular embodiment, wall 11 can be an interior wall and container 10 can also comprise an exterior wall (not shown in FIG. 1). Such an arrangement may be desirable particularly if container 10 is to hold hot or cold liquids, for example such that container 10 comprises a double-walled container with an air gap or evacuated space in between an interior wall and an exterior wall, such that improved insulating characteristics are provided.

With reference to FIGS. 1 and 2, apparatus 1 includes capture element 30 for treatment of volume of water 70. Such treatment comprises passing at least a portion of volume of water 70 through sorbent media 40 that is contained within, present on the surface of, or otherwise physically associated with, capture element 30. Capture element 30 and associated sorbent media 40 can serve to treat volume of water 70 so as to eliminate, minimize or reduce any unsatisfactory taste, odor, color, etc., that may be perceived to be present. As such, capture element 30 is arranged to present sorbent media 40 so that water can be brought into intimate contact with sorbent media 40 (e.g. by passing the water through capture element 30 in such a manner that at least a portion of the water flows through sorbent media 40 ) so that at least a portion of any undesirable substances in the water can be removed by sorbent media 40. This passing of water through capture element 30 can be performed by moving capture element 30 through at least a portion of volume of water 70, or by holding capture element 30 stationary and flowing at least a portion of volume of water 70 through stationary capture element 30.

In one embodiment, capture element 30 comprises a thickness, and a first major side 31 comprising a first major surface, and a second major side 32 comprising a second major surface. In a particular embodiment, capture element 30 comprises at least one water permeable layer 35 with sorbent media 40 arranged adjacent to layer 35, with layer 35 comprising one major surface of capture element 30 and sorbent media 40 comprising the other major surface of capture element 30. In a further embodiment, sorbent media 40 is attached to layer 35. In another embodiment (shown in an exemplary manner in FIG. 2), capture element 30 comprises a second water permeable layer 36, such that sorbent media 40 is contained within the space between first and second layers 35 and 36 (in this configuration, it may not be necessary that sorbent media 40 be attached to layer 35 or 36). Variations of this approach are possible. For example, either layer 35 or 36 may take the form of a flange that only partially covers sorbent media 40.

Layers 35 and 36 (if present) of capture element 30 should be water permeable and should allow sufficient exposure of sorbent media 40 to water that permeates through layer 35 and/or layer 36. That is, layers 35 and/or 36 should not unacceptably block or occlude portions of sorbent media 40. Accordingly, layers 35 and/or 36 can comprise for example, materials such as perforated sheets, mesh or screens, porous webs, porous membranes, and the like.

As disclosed herein, the treating of volume of water 70 includes any operation in which sorbent media 40 partially or completely removes one or more substances that might be perceived as adversely affecting the aesthetic qualities of the water (e.g., odor, taste, color, etc.). Such substances might include, but are not limited to, organic compounds; halogen compounds or halogenated organic compounds (e.g., as might be present as residual products from such processes as chlorine-based water treatment); biomolecules; tannins; colored dissolved organic matter; ions (e.g., divalent cations such as $Mg^{++}$ and $Ca^{++}$), and the like.

Removal of such substances by sorbent media 40 may occur via physical adsorption (onto and/or into the sorbent media), chemical reaction, catalysis, chelation, exchange, complexation, etc. of the substance (whether as individual molecules, ions, aggregates, complexes, colloids, etc.), by physical entrapment (e.g., of particles, silt, etc.) within the sorbent media, and the like. In this context, the term removal includes the chemical reaction or conversion of a substance to a form that is less aesthetically undesirable (whether by the substance reacting with a component of the sorbent media, or in a reaction catalyzed by a component of the sorbent media).

Sorbent media 40 may comprise any material capable of performing such removal as described above. In particular, sorbent media 40 may be chosen from the class of materials generally known as activated carbons.

In one embodiment, sorbent media 40 may be comprised of particulate materials. Such sorbent media might include for example, powdered activated carbon, granular activated carbon, zeolites, molecular sieves, ion exchange resins, fumed silica, precipitated silica and the like. In such a case, an assembly of a suitable number of such particles may be contained within capture element 30.

In another embodiment, sorbent media 40 can be provided in the form of one or more contiguous elements (e.g., blocks, mats, membranes, etc.). For example, a so-called activated carbon cloth can be used, such as the materials available from Charcoal Cloth International (a division of Calgon Carbon of Pittsburg, Pa.), under the trade designation Zorflex®. Such activated carbon cloth may be knitted or woven; or, activated carbon fibers may be used in the form of a nonwoven, felt, etc. Multiple layers of such activated carbon cloth can be used in a stacked configuration, if desired.

However provided, it may be desirable to arrange sorbent media 40 such that at least some of the water that passes through capture element 30 does so by way of a tortuous path through sorbent media 40. The provision of such a tortuous path may increase the degree of intimate contact of the water with the sorbent media (e.g., such that at some point during the course of a given parcel of water passing through the sorbent media, the parcel of water comes within about 100 microns or less of a surface of the sorbent media) so as to increase the efficiency of the sorbent media's removal of undesirable substances from the water. Sorbent media 40 may be pleated if desired in order to increase the surface area available for treatment.

Capture element 30 may comprise other components or materials in addition to sorbent media 40. For example, porous media (e.g., fibrous filtration media, etc.) may be provided that enhance the ability of capture element 30 to capture and retain particulates that may be present. Such additional materials may, for example, be present as an additional layer or layers adjacent (e.g., above and/or below) a layer of sorbent media 40. Capture element 30 can also have other components such as reinforcing ribs or other members to provide appropriate mechanical strength and integrity. If desired, sorbent media 40 and/or other components of capture element 30 can comprise treatments such as silver impregnation.

Capture element 30 comprising sorbent media 40 can be provided in a variety of arrangements. For example, capture element 30 can comprise a generally disc-shaped device that is arranged to fit within single interior volume 13 of single container 10, such that minor outer radial edge 33 of capture element 30 is adjacent to inner surface 16 of wall 11 of container 10 over part of, or substantially all of, the circumference of minor outer edge 33. In a further embodiment, surface 34 of minor outer edge 33 of capture element 30 contacts inner surface 16 of wall 11 over a portion of, or over substantially all of, the circumference of minor outer edge 33. (The above descriptions are with reference to the particular embodiment in which container 10 is generally cylindrical and capture element 30 is generally disc-shaped. As previously mentioned, container 10 does not have to be round in cross section; if container 10 is oval, square, etc., capture element 30 can be correspondingly designed to match). If desired, minor outer edge 33 can comprise a flexible edge member (e.g., gasket) that at least partially contacts inner surface 16 of wall 11.

In the exemplary embodiment shown in FIG. 1, capture element 30 is oriented such that longitudinal axis "l" of element 30 is oriented substantially parallel to longitudinal axis "L" of container 10, and radial plane "r" of element 30 is oriented substantially parallel to radial plane "R" of container 10. In a specific embodiment, capture element 30 is movable generally along longitudinal axis "L" of container 10. In one embodiment, capture element 30 is movable by way of being attached to a terminal end of elongated rod 50 which is generally aligned with longitudinal axis "L" of container 10 and which protrudes outwardly from container 10 such that it can be grasped by an operator. (Optional handle 51 may be provided on the other terminal end of rod 50 to aid in this). Further, if lid 20 is present on container 10, hole 21 can be provided to allow rod 50 to protrude, as shown in FIG. 1. Capture element 30, rod 50, and/or lid 20 can all be separable from container 10 (as a unit or individually), e.g. in order to deposit water into container 10. Capture element 30 can be designed to be separable from rod 50 if desired (e.g., by a threaded screw connection, a clip or other type of quick connect/disconnect device, and the like). Capture element can thus be removed from container 10 if desired for cleaning or replacement. Capture element 30 can be designed to be replaceable in its entirety. Or, capture element 30 can be retained and sorbent media 40 (and/or any other components associated with capture element 30) replaced.

With reference to the exemplary embodiment shown in FIG. 1, by grasping the outwardly protruding end of rod 50 and pushing and pulling in succession (in a direction generally along axis "L"), capture element 30 can be moved back and forth partly or completely through volume of water 70, in a reciprocating motion. For example, with capture element 30 initially residing in air space 80 above volume of water 70, handle 51 can be pushed down (i.e., toward container 10 in direction L$^-$) so that capture element 30 traverses longitudinally through part or all of volume of water 70 (for example, until major side 32 of capture element 30 contacts the inner surface of base 12 of container 10). During this process, at least a portion of volume of water 70 may pass through capture element 30. Handle 51 can then be pulled up (i.e., away from container 10 in direction L$^+$) so that capture element 30 traverses upwards through volume of water 70 (e.g., until capture element 30 again resides in air space 80), during which operation at least a portion of volume of water 70 may again pass through capture element 30. This process may be repeated multiple times, e.g., such that two, three, five, or as many as ten or more passes of capture element 30 through volume of water 70 have been performed.

Although described herein as being performed with container 10 in a generally vertical orientation such that volume of water 70 resides under gravity's influence in the lowermost portion of interior volume 13 of container 10 (and with terms such as bottom/top, above/below, up/down, etc., generally used with reference to operation of apparatus 1 with container 10 held in this vertical orientation), it is also possible to perform the above-described process with container 10 held in other orientations, e.g. with provision being made to prevent or minimize leakage of water out of container 10.

Other arrangements of capture element 30 within container 10 are possible besides those described above. For example, rather than being connected to rod 50 and being moved by way of an operator grasping rod 50, capture element 30 can be connected by a series of linkages to a manually operated (for example, thumb-operated) actuator (which might be incorporated into, e.g., an external handle). And, rather than capture element 30 being arranged such that it moves in a direction generally aligned with longitudinal axis "L" of container 10 (with radial plane "r" of capture element 30 remaining generally aligned with radial plane "R" of container 10), capture element 30 can instead be arranged for example such that at least a portion of it is hingedly connected to wall 11 or base 12 of container 10. In this arrangement, capture element 30 can be motivated (e.g., by a series of linkages connected to a manually operated actuator) to rotate at least partially about the hinge in such a manner as to sweep at least a portion of capture element 30 through at least a portion of volume of water 70.

Still other arrangements of capture element 30 are possible beyond those described above. For example, rather than movable capture element 30 being traversed through volume of water 70, capture element 30 could be stationary and at least a portion of volume of water 70 could flow through capture element 30, for example motivated by a suitable piston, plunger, pump, or the like. Such passing of water can be performed in a reciprocating manner; e.g., by passing at least a portion of volume of water 70 through capture element 30, followed by passing at least some of this passed water back through capture element 30 in the opposite direction. Alternatively, at least some of the passed water can be recirculated (without passing through capture element 30) so as to be again passed through capture element 30 in the same direction.

Apparatus 1 may be particularly suitable for manual (hand) operation by a user, and/or to be operated by a relatively low power source (e.g., a battery). Accordingly, the force required in order to pass water through capture element 30 may be appropriately low. Such a condition can be achieved by the choice of a sorbent media that is sufficiently permeable to water (e.g., that exhibits a low pressure drop). Instead of this, or in addition to this, apparatus 1 may comprise one or more bypass apertures 60. Bypass aperture(s) 60 may allow a certain proportion of the water that encounters capture element 30 to avoid passing through capture element 30 and/or may allow a certain proportion of the water passing through capture element 30 to avoid passing through sorbent media 40. In doing this, bypass aperture(s) 60 may increase the ease of performing the operations described above (e.g., traversing capture element 30 through volume of water 70), by reducing the force required to perform these operations. (With specific reference to the embodiment shown in FIG. 1, the presence of bypass aperture 60 may also allow capture element 30 to be traversed through volume of water 70 in direction $L^+$ without water being forced out of container 10 through any holes or vents in lid 20, if such features are present).

In various embodiments, bypass aperture 60 can comprise one or more through-holes (e.g., hollow passages or tubes passing between major side 31 and major side 32 of capture element 30) that do not contain sorbent media 40 therein, as shown in an exemplary manner in FIG. 2. In various embodiments, bypass aperture(s) 30 can be achieved by simply providing one or more regions within capture element 30 that do not contain sorbent media 40. For example, if sorbent media 40 is a contiguous piece (e.g., a membrane, layer of cloth or mesh, etc.), one or more through-apertures (e.g., die cut holes, perforations, punctures, etc.) may be provided in contiguous piece of sorbent media 40 such that some portion of the water that enters capture element 30 through major side 31 (or 32) can pass through and exit the other major side of capture element 30 while bypassing (i.e., not passing through in such a manner to as to encounter intimate contact with) sorbent media 40.

In certain embodiments, (for example, with an activated carbon cloth with a very open structure), bypass apertures may be inherently provided in sorbent media 40. Such a property may be reflected in a relatively low pressure drop exhibited by the sorbent media. Thus in various embodiments, sorbent media 40 may exhibit a pressure drop of less than about 5 psi, less than about 2 psi, or less than about 1 psi, when water is passed through sorbent media 40 at a flowrate of approximately 0.5 Liters/second.

In other embodiments, separate, unconnected pieces of sorbent media 40 can be arranged (e.g., generally in the same plane) so as to collectively comprise capture element 30, with one or more bypass apertures being provided in between the separate pieces of sorbent media 40.

In another alternative embodiment, bypass aperture 60 can comprise one or more through-notches in minor outer edge 33 of element 30, such that each notch provides a gap between surface 34 of minor outer edge 33 of element 30, and inner surface 16 of wall 11 of container 10. In this arrangement, some portion of volume of water 70 is allowed to bypass capture element 30 without entering capture element 30 (that is, is allowed to pass around the edge of element 30). In this context, the term bypass aperture encompasses an arrangement in which one or more discrete notches are not necessarily present in minor radial edge 33 of capture element 30, but instead in which, over a portion or all of the circumference of capture element 30, the diameter of capture element 30 is slightly smaller (e.g., from about 95% of to about 99.5% of) than that of inner surface 16 of wall 11 of container 10, such that the effect of the smaller diameter is to allow sufficient water to pass around edge 33 of capture element 30 that the bypass functionality is achieved. Such a bypass aperture may also be achieved by providing one or more slits in inner surface 16 of wall 11 of container 10, aligned so as to permit water to move generally along the longitudinal axis "L" of container 10, such that water can pass through the slit(s) and thus bypass around edge 33 of capture element 30.

In general, such bypass aperture(s) (whether located in the interior of capture element 30, along minor edge 33 of element 30, in the interior of sorbent media 40, in wall 11 of container 10, etc.), may comprise a single (e.g., relatively large) aperture, a plurality of (e.g., relatively small) apertures, and/or a mixture of the two, as desired, as long as the desired functionality is achieved. Such apertures do not have to be circular, or even regular or uniform, in cross section, and may comprise holes, slits, crevices, cracks, notches, perforations, punctures, etc., again, as long as the desired functionality is provided.

However arranged, one or more bypass apertures may be provided such that capture element 30 exhibits (when a volume of water is treated) an appropriate bypass ratio, defined herein as the ratio of the amount of water that flows through bypass aperture or apertures 60 to the amount of water that passes through sorbent media 40. In various embodiments, capture element 30 exhibits a bypass ratio of at least about 5:95, at least about 10:90, or at least about 20:80. In additional embodiments, capture element 30 exhibits a bypass ratio of at most about 60:40, at most about 50:50, or at most about 40:60.

In one embodiment, bypass aperture(s) 60 are designed (e.g., as one-way valves) such that the bypass ratio differs depending on the direction of passing of water through capture element 30. That is, with regard to the specific embodiment of FIGS. 1 and 2, apparatus 1 could be designed such that the bypass ratio encountered in passing capture element down through volume of water 70 (in direction $L^-$) is lower than the bypass ratio encountered in passing capture element upward through volume of water 70 (in direction $L^+$).

As mentioned herein, sorbent media 40 may be selected such that it has a desirably low pressure drop. Also as mentioned herein, instead of this, or in addition to this, one or more bypass apertures 60 may be present (whether in capture element 30 or in container wall 11). Such arrangements may allow water to be processed by the apparatus described herein, without encountering an unacceptably high pressure drop of water; that is, without requiring an unduly high amount of force to process a volume of water.

In various embodiments, capture element 30 exhibits a pressure drop of less than about 5 psi, less than about 2 psi, or less than about 1 psi, when water passes through capture element 30 at a flowrate of approximately 0.5 Liters/second. (Again, such pressure drop may result from the intrinsic water-permeability of sorbent media 40 in capture element 30, and/or from the presence of bypass aperture(s) 30). In specific embodiments with regard to the exemplary apparatus shown in FIGS. 1 and 2, a total force of less than about 20 pounds, less than about 10 pounds, less than about 5 pounds, or less than about 2 pounds, is required to move capture element 30 through volume of water 70, at a speed that corresponds to a water flowrate of approximately 0.5 Liters/second through capture element 30.

In performing the methods described herein, a volume of water 70 is deposited into interior volume 13 of container 10, after which at least a portion of the water is passed through capture element 30 (whether by moving the water through capture element 30, or moving capture element 30 through the water) such that at least a portion of the water that passes through capture element 30 passes through sorbent media 40 (in a manner that provides intimate contact between the water and sorbent media 40) such that at least a portion of any undesirable substance(s) present in the water is captured by sorbent media 40 and is thus removed from the water. In a specific embodiment, water is passed through capture element 30 such that some or all of the water experiences multiple (e.g., at least two) passes through capture element 30.

The apparatus and methods disclosed herein thus rely on the approach that, rather than treating a volume of water by forcing the entirety of the volume of water through a sorbent media in a single pass, only such portion of the volume of the water as can be easily passed through the sorbent media by a nominal force (e.g., as can be achieved by manual operation by a person) is treated in an individual pass. However, the apparatus is designed such that multiple passes in succession can be performed (e.g., in a short time). Thus, by the time that several passes (e.g., as least two, possibly as many as 10 or more) of at least a significant portion of volume of water 70 through capture element 30 are performed, the majority of the water in water volume 70 may have received treatment (e.g., may have passed through the sorbent media such that at least a portion of any undesirable substances contained in the water was removed).

The apparatus and methods presented herein also differ from conventional approaches in which treated water is kept separated from untreated water. Instead, in the present approach, water that flows through the sorbent media, and water that passes through the bypass aperture(s), may be mixed together with each other after the completion of each individual pass. While this may appear disadvantageous, the use of multiple passes may nevertheless allow treatment of water to an acceptable extent.

A specific illustrative example can be considered in which each pass of a volume of water through a capture element is performed with a 20:80 bypass ratio. That is, in each pass, 80% of the water passes through the capture element in such a manner as to intimately contact the sorbent media, with the remaining 20% of the water passing through the (at least one) bypass aperture so as to pass from one major side of the capture element to the other major side of the capture element untreated (i.e., without intimately contacting the sorbent media). Upon, for example, four one-way passes (with the treated water and bypassed water being well mixed after each pass), the odds of any parcel or subset of the water having been diverted by the bypass aperture(s) during all four passes would be expected to be $(0.2)^4$ or approximately 0.16%. Thus, by the time four passes are completed, approximately 99.84% of the volume of water would be expected to have passed through the sorbent media at least one time and thus to have been treated.

The above illustrative example thus demonstrates that even with use of an apparatus comprising a bypass ratio of 20:80 (such that the capture efficiency of undesirable materials might at first glance seem unacceptably low), by virtue of the apparatus' allowing multiple passes of water through the capture element it may be possible to perform water treatment such that acceptable results can be achieved.

At the conclusion of the desired number of passes, capture element 30 may be positioned such that it resides in volume of water 70 (e.g., in the position shown in FIG. 1). In such a position, capture element 30 may continue to scavenge a small portion of substances from the water remaining in contact with or within capture element 30. Or, capture element 30 may be retracted in direction $L^+$ so that it is out of contact with volume of water 70. Regardless, after being treated as described herein, volume of water 70 may be consumed directly from container 10, or may be transferred therefrom (e.g., poured) into a separate container for consumption or other use.

In addition to the aforementioned treatment of water to reduce the amount of undesirable substances that potentially impacts the taste, odor, and/or color of the water, apparatus 1 may serve other purposes as well. For example, apparatus 1 may be equipped to at least partially treat volume of water 70 by the use of antimicrobial agents, chemicals, treatments, and the like. Apparatus 1 may serve to soften the water via use of ion-exchange resins and the like. In general, however, it is noted that apparatus 1 is intended for the aesthetic improvement of potable water rather than the purification of potentially nonpotable water to the extent to make it potable for human consumption.

EXAMPLES

A portable "French Press" coffee mug was obtained from Planetary Designs, Missoula, Mont. The device appeared to be similar to that described in U.S. Pat. No. 5,887,510. The device comprised a double-walled cylinder with the interior wall defining a right circular cylinder of approximately 78 mm in diameter and 143 mm in length. The device further comprised a plunger assembly comprising a disc-shaped filter unit of approximately 78 mm diameter, comprising a circular metal mesh screen of approximately 63 mm diameter, radially surrounded by a plastic edge ring comprising narrow (e.g., less than approximately 0.5 mm) slits spaced around the circumference of the plastic ring, so that the plastic edge ring formed a series of "fingers" with narrow slits therebetween. The filter unit was connected to the end of a metal rod the other end of which protruded through a hole in the lid provided. The lid further comprised openings for drinking and for venting.

A variety of activated carbon sorbent media were obtained and used in the above-described apparatus:

Activated carbon block was prepared in similar manner as described in U.S. Pat. Nos. 7,112,280 and 7,169,304 and 7,112,272. A disk of this material of approximately 6.3 mm in thickness and approximately 63 mm in diameter was placed underneath the metal mesh screen of the plunger assembly and was held in place by hot melt glue around the edge of the activated carbon disk.

Activated carbon cloth was obtained from Charcoal Cloth International (a division of Calgon Carbon Corp, Pittsburg, Pa.) under the trade designation Zorflex®, Grade FM5. A single layer disk of this cloth of approximately 68 mm in diameter was placed underneath the metal mesh screen of the plunger assembly and was held in place by a stiff wire mesh screen placed underneath the activated carbon cloth.

Activated carbon fiber material was obtained from Osaka Gas, Osaka Japan, under the trade designation ACF Grade A-10. A single layer disk of this material of approximately 68 mm in diameter was placed underneath the metal mesh screen of the plunger assembly and was held in place by a stiff wire mesh screen placed underneath the activated carbon cloth.

The ability of these sorbent media to remove a substance from potable water was evaluated via the following procedure. Potable water was obtained with an initial free chlorine concentration of approximately 2.1 ppm (this and all other chlorine measurements shown herein were obtained by the use of a Hach DR2010 Spectrophotometer, in similar manner to that described in Test Method 8021 (also commonly known as the "DPD Method")). A volume of water of approximately 500 cc was deposited in the interior volume of the above described device. The lid was then attached to the open (top) end of the device.

Treatments of separate volumes of water were performed in two different ways. The first method used a single traversal (carried out over approximately 3 seconds) of the filter unit containing the sorbent media, downward through the volume of water until the filter unit contacted the bottom surface of the interior of the container. The water was then removed from the container and the free chlorine content was measured. In the other method of treatment, the filter unit containing the sorbent media was traversed up and down through the volume of water multiple times (approximately 5 round trips) over approximately 10 seconds. The water was then removed from the container and the free chlorine content was measured (again, the initial free chlorine content was approximately 2.1 ppm). The results are listed in Table 1 (NR=Not Recorded).

TABLE 1

| Sorbent Media | Mass of Sorbent Media (grams) | Free Chlorine Content, PPM | |
|---|---|---|---|
| | | One Pass | Multiple Passes |
| Activated Carbon Block | 6.0 | 1.4 | 0.41 |
| Activated Carbon Cloth (FM5) | 0.67 | 0.83 | 0.07 |
| Activated Carbon Fiber (ACF, Osaka) | 1.0 | NR | 0.07 |

The tests and test results described above are intended solely to be illustrative, rather than predictive, and variations in the testing procedure can be expected to yield different results. The foregoing detailed description and examples have been given for clarity of understanding only. No unnecessary limitations are to be understood therefrom.

The present invention has now been described with reference to several embodiments thereof. It will be apparent to those skilled in the art that changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. An apparatus for treating a volume of water, comprising:
a container defining an interior volume adapted to receive a volume of water;
within the interior volume of the container, a capture element comprising a thickness and first and second major sides and comprising activated carbon sorbent media, wherein the capture element is arranged to be moved repeatedly through at least a portion of the volume of water.

2. The apparatus of claim 1 wherein the interior volume comprises a generally longitudinal axis and wherein the capture element is arranged to be traversed repeatedly through at least a portion of the volume of water, in a direction generally aligned with the longitudinal axis of the interior volume of the container.

3. The apparatus of claim 1 wherein the apparatus further comprises at least one bypass aperture arranged such that when the capture element is moved through at least a portion of the volume of water, a portion of the water passes from one major side of the capture element to the other major side of the capture element without intimately contacting the activated carbon sorbent media.

4. The apparatus of claim 3 wherein the at least one bypass aperture comprises at least one through-passage that extends from one major side of the capture element to the other major side of the capture element and that does not contain activated carbon sorbent media.

5. The apparatus of claim 4 wherein the capture element comprises a minor outer edge and wherein the at least one bypass aperture comprises at least one notch or slit in the minor outer edge of the capture element.

6. The apparatus of claim 3 wherein the at least one bypass aperture provides a bypass ratio of at least about 20:80.

7. The apparatus of claim 1 wherein the container defines a single interior volume.

8. The apparatus of claim 1 wherein the first and second major sides of the capture element comprise first and second water-permeable layers and wherein the activated carbon sorbent media is contained between the first and second major water-permeable layers.

9. The apparatus of claim 1 wherein the container defines an interior volume that is an elongated, generally circular cylinder and wherein the capture element comprises a disc whose average diameter is from about 95% to about 99.5% of the diameter of the container interior volume.

10. The apparatus of claim 1 wherein the container comprises a removable lid.

11. The apparatus of claim 10 wherein the apparatus comprises an elongated rod with a first terminal end connected to the capture element and a second terminal end that protrudes out of the container through an aperture in the lid.

12. The apparatus of claim 1 wherein the activated carbon sorbent media comprises at least one layer of activated carbon cloth.

13. The apparatus of claim 1 wherein the capture element exhibits a pressure drop of water through the capture element of less than about 5 psi at a flowrate of 0.5 Liters/sec.

14. A method of treating water, the method comprising:
providing an apparatus that comprises:
a container that defines an interior volume adapted to receive a volume of water, and,
a capture element comprising a thickness and first and second major sides and comprising sorbent media;
depositing a volume of water into the interior volume of the container; and,
passing at least a portion of the volume of water through the capture element from one major side of the capture element to the other major side of the capture element, at least two times.

15. The method of claim 14 wherein the sorbent media comprises activated carbon.

16. The method of claim 14 wherein the apparatus further comprises at least one bypass aperture wherein when at least a portion of the volume of water is passed through the capture element, some water intimately contacts the sorbent media and some water passes through the at least one bypass aperture such that it does not intimately contact the sorbent media.

17. The method of claim 16 wherein the water that intimately contacts the sorbent media and the water that passes through the at least one bypass aperture are mixed together after intimately contacting the sorbent media and passing through the at least one bypass aperture, respectively.

18. The method of claim 16 wherein the ratio of the amount of water passing through the at least one bypass aperture to the amount of water intimately contacting the sorbent media is at least about 20:80.

19. The method of claim 14 wherein the passing of at least a portion of the volume of water through the capture element is performed by manual actuation by an operator.

20. The method of claim 14 wherein the capture element is movable and wherein the step of passing of at least a portion of the volume of water through the capture element at least two times comprises the sequential steps of moving the capture element through at least a portion of the volume of water in a first direction and then moving the capture element through at least a portion of the volume of water in a second direction generally opposite to the first direction.

21. The method of claim 14 wherein the capture element is stationary and wherein the step of passing of at least a portion of the volume of water through the capture element at least two times comprises the sequential steps of flowing water through the capture element in a first direction, and flowing water through the capture element in a second direction that is generally opposite to the first direction.

22. The method of claim 14 wherein the capture element is stationary and wherein the step of passing at least a portion of the volume of water through the capture element at least two times comprises passing water through the capture element and recirculating the passed water and passing at least a portion of the passed water through the capture element again, in the same direction, at least a second time.

23. The method of claim 14 wherein the volume of water remains in the interior volume of the container after the step of passing at least a portion of the volume of water through the capture element from one major side of the capture element to the other major side of the capture element at least two times.

24. The method of claim 14 wherein the sorbent media is capable of removing at least one substance from water and wherein the passing at least a portion of the volume of water through the capture element from one major side of the capture element to the other major side of the capture element at least two times results in the removal of at least a portion of the at least one substance from the volume of water.

* * * * *